UNITED STATES PATENT OFFICE.

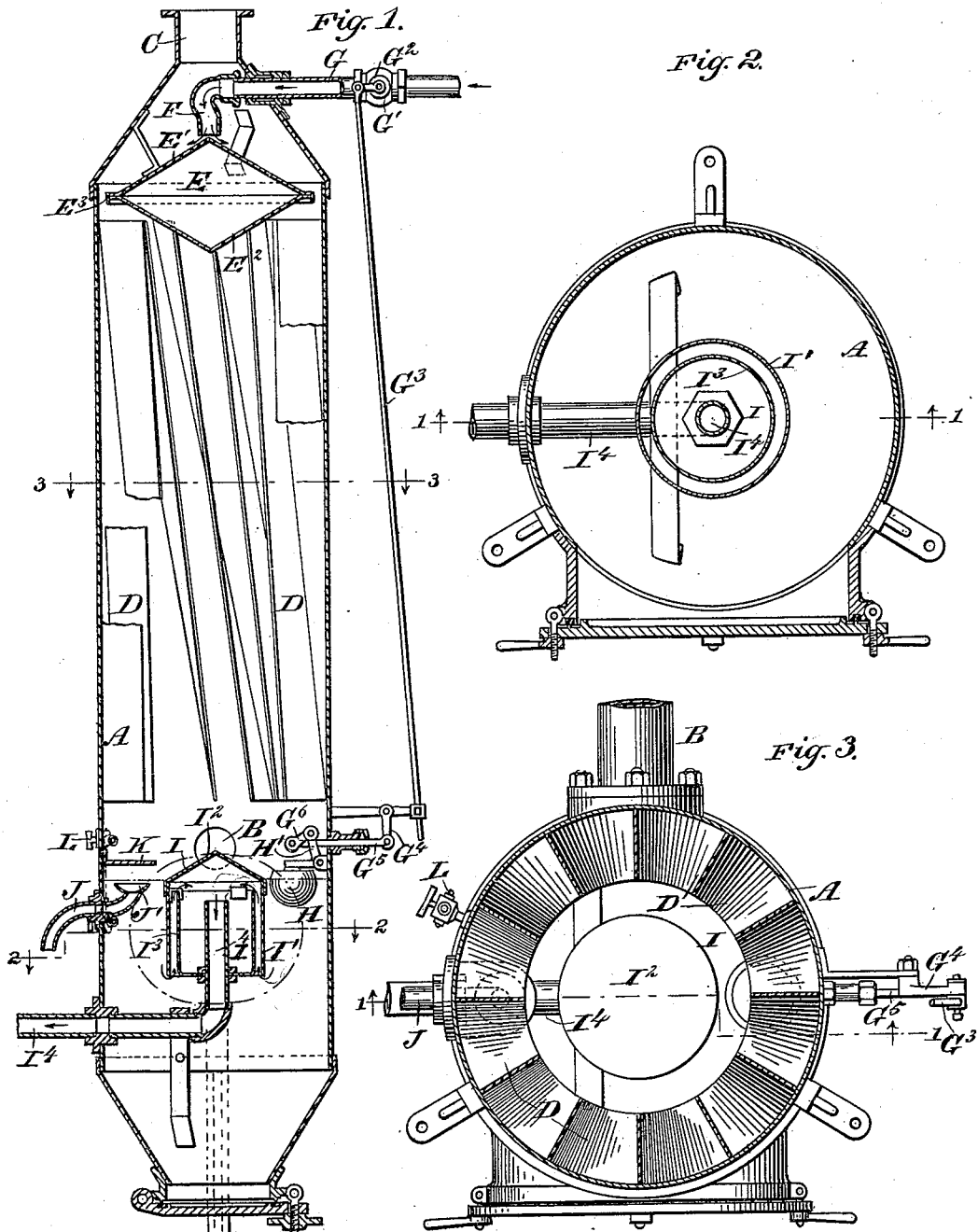

JOSEPH BELL, OF TROUTDALE, OREGON.

FEED-WATER HEATER.

SPECIFICATION forming part of Letters Patent No. 470,972, dated March 15, 1892.

Application filed June 13, 1891. Serial No. 396,133. (No model.)

*To all whom it may concern:*

Be it known that I, JOSEPH BELL, a subject of the Queen of Great Britain, residing at Troutdale, in the county of Multnomah and State of Oregon, have invented a new and Improved Feed-Water Heater, of which the following is a full, clear, and exact description.

The object of the invention is to provide a new and improved feed-water heater which is simple and durable in construction, very effective in operation, and arranged to heat the feed-water by means of the exhaust-steam of the engine.

The invention consists of a casing containing spirally-arranged plates and a cone-shaped water-distributer held above the said plates and discharging at its edge onto the said plates.

The invention also consists of certain parts and details and combinations of the same, as will be described hereinafter, and then pointed out in the claims.

Reference is to be had to the accompanying drawings, forming a part of this specification, in which similar letters of reference indicate corresponding parts in all the figures.

Figure 1 is a sectional side elevation of the improvement on the line 1 1 of Figs. 2 and 3. Fig. 2 is enlarged sectional plan view of the same on the line 2 2 of Fig. 1, and Fig. 3 is a similar view of the same on the line 3 3 of Fig. 1.

The improved feed-water heater is provided with a casing A, preferably of circular form, and arranged vertically, as shown in Fig. 1. Into the lower part of casing A enters the exhaust-pipe B for discharging the exhaust-steam into the casing A, the latter being open at the top C to permit the exhaust-steam to pass into the open air after rising and passing through the casing A.

In the casing A above the entrance of the exhaust-pipe B are arranged a series of upwardly-extending plates D, arranged spirally, so that the exhaust-steam in traveling upward in the casing A receives a rotary motion by coming in contact with the spirally-arranged plates. Above the upper ends of the latter is arranged a water-distributer E, made in the shape of a double cone, the bases of the two cones E' and E² being attached one upon the other, as is plainly shown in Fig. 1. The upper cone E' is formed with a downwardly-extending circular flange E³, extending to within a short distance of the inner surface of the casing A, and serving to guide the water over the edge of the cone upon the upper ends of the plates D.

On the apex of the upper cone E' discharges a pipe F, made in the shape of an elbow and secured to the end of the water-supply pipe G, connected with a suitable source of water-supply. The pipe G contains a valve G', carrying on its valve-stem an arm G², connected by a link G³ with a bell-crank lever G⁴, connected with a rod G⁵, fitted to slide horizontally in a suitable stuffing-box held in the lower part of the casing A. The rod G⁵ passes to the inside of the casing A and is connected at its inner end by an arm G⁶ with a bell-crank lever H', carrying a float H, controlled by the accumulating water in the lower part of the casing A, so as to control the movement of the valve G' in the supply-pipe G, to regulate the amount of water passing into the casing A.

In the lower part of the casing A is also arranged a water-outlet I, provided with an exterior cylindrical casing I', open at the bottom and provided on its top with a cap I², preferably cone-shaped, as shown. Within the cylinder I' is arranged a second concentric cylinder I³, closed at the bottom and open at the top, the upper edge being below the upper edge of the cylinder I'. Thus the water within the lower part of the casing A passes between the cylinders I' and I³ from the bottom to flow over the upper edge of the inner cylinder I³, and finally pass into a pipe I⁴, extending into the inner cylinder I³ and leading to the outside of the casing A to connect with the water-compartment of the boiler. It will be seen that with this water-outlet scum, oil, and other impurities in the water are prevented from passing into the pipe I⁴, as the outer cylinder I' and its cap I² prevent the accumulating impurities from passing into the pipe I⁴.

In order to draw off the impurities, a pipe J is provided, which is held in the wall of the casing A and formed at its inner end with a cup J', arranged at about the height of the water-level, so that the impurities can flow into the cup and out of the casing through the pipe J. In order to protect the cup J' from the water flowing down the plates D, a protecting-plate K is provided, secured to the inside of the casing A a short distance above the cup J', as is plainly shown in Fig. 1. A gage-cock L is also arranged in the casing A above the plate K, as is shown.

The lower part of the casing A is further provided with suitable doors or man-holes for conveniently cleaning the lower part of the casing of sediment whenever desired. It will be seen that the water entering through the pipe G and flowing through the elbow F is equally distributed on the upper cone E', as the said elbow F discharges at the apex of the said cone. The water flowing down the outer surface of the cone $E^2$ finally flows over the annular flange $E^3$ onto the spirally-arranged plates D, which guide the water in its downward course and at the same time bring it in contact with the exhaust-steam rising in the casing A along the said plates, as previously described. When the water has accumulated in the lower part of the casing A so that its level is above the upper edge of the cylinder $I^3$, then the water can flow over the upper edge of the inner cylinder to finally pass into the pipe $I^4$ to be taken to the boiler. It is, however, not necessary that the water should rise above the upper edge of the cylinder $I^3$ in order that the water can be drawn off, as the outer cylinder permits of pumping water if the level falls, and at the same time receiving it as hot as if taken from the surface. The exhaust-steam striking the top of said cylinder imparts additional heat to the water inside. The supply of water through the pipe G is regulated by the float H, which opens and closes the valve G', according to the height of the water in the lower part of the casing A.

It is understood that the spirally-arranged plates D add considerable heating-surface to the casing A. It will further be seen that the lower cone $E^2$ serves to guide the upwardly-passing steam to the sides of the casing, so as to meet the water flowing over the edge of the cone E' before the said steam passes out through the open top C.

Having thus described my invention, what I claim as new, and desire to secure by Letters Patent, is—

1. A feed-water heater comprising a casing connected at its lower part with a steam-supply, upwardly-extending and spirally-arranged deflector-plates in the casing above the inlet of the steam-supply, and a water-distributer above the deflectors and discharging thereon, substantially as and for the purpose set forth.

2. A feed-water heater comprising a casing connected at its lower part with a steam-supply, spirally-arranged plates held in the said casing above the inlet of the said steam-supply, a cone-shaped water-distributer held within the said casing above the said plates and discharging at its edge onto the said plates, and a water-supply pipe discharging onto the apex of the said cone-shaped distributer, substantially as shown and described.

3. In a feed-water heater, the combination, with a casing closed at the bottom, open at the top, and connected at its lower part with a steam-supply, of plates arranged spirally within the said casing, a cone-shaped water-distributer arranged in the upper part of the said casing above the said plates, and a water-supply pipe discharging onto the apex of the said distributer, substantially as shown and described.

4. In a feed-water heater, the combination, with a casing closed at the bottom, open at the top, and connected at its lower part with a steam-supply, of plates arranged spirally within the said casing, a cone-shaped water-distributer arranged in the upper part of the said casing above the said plates, a water-supply pipe discharging onto the apex of the said distributer, and a water-outlet held in the lower part of the said casing to discharge the accumulating water, substantially as shown and described.

5. In a feed-water heater, the combination, with a casing closed at the bottom, open at the top, and connected at its lower part with a steam-supply, of plates arranged spirally within the said casing, a cone-shaped water-distributer arranged in the upper part of the said casing above the said plates, a water-supply pipe discharging onto the apex of the said distributer, a valve held in the said pipe, and a float arranged in the lower part of the said casing and connected with the said valve to control the inlet of water through the said water-supply pipe, substantially as shown and described.

6. In a feed-water heater, the combination, with a casing connected in its lower part with a steam-supply, of spirally-arranged plates held in the said casing and terminating at their lower ends above the said steam-supply, a distributer held in the upper end of the said casing and formed of two cones fastened together at their bases, the upper cone discharging at its edge onto the said plates, and a water-supply pipe discharging onto the apex of the upper cone, substantially as shown and described.

7. In a feed-water heater, the combination, with a casing, of a water-outlet comprising an exterior cylinder closed at the top and open at the bottom, a concentric cylinder open at the top and closed at the bottom and held within the said first-named cylinder, and an outlet-pipe extending into the exterior cylinder, substantially as shown and described.

JOSEPH BELL.

Witnesses:
G. ROSENBLATT,
JOHN P. WILDMAN.